United States Patent [19]

Thomas

[11] 4,271,352

[45] Jun. 2, 1981

[54] LOST PERSONAL ACCESSORY RETURN METHOD AND ARTICLE

[76] Inventor: Lon G. Thomas, 1314 N. Floyd Rd., Richardson, Tex. 75080

[21] Appl. No.: 36,307

[22] Filed: May 7, 1979

[51] Int. Cl.³ .................... G06F 15/20; G06K 19/02
[52] U.S. Cl. .................................. 235/375; 235/488
[58] Field of Search ............. 235/492, 487, 441, 483, 235/375, 488, 489, 490; 340/149 A, 149 R; 40/2 A, 17; 101/369

[56] References Cited

U.S. PATENT DOCUMENTS

| | | | |
|---|---|---|---|
| 2,312,204 | 2/1943 | Weindel | 40/2 A |
| 2,357,641 | 9/1944 | Evalt | 40/2 A |
| 3,200,240 | 8/1965 | Hammel | 235/443 |
| 3,702,464 | 11/1972 | Castrucci | 101/369 |
| 3,764,742 | 10/1973 | Abbott | 340/149 A |
| 3,906,447 | 9/1975 | Crafton | 340/149 A |
| 4,105,156 | 8/1978 | Dethloff | 235/441 |
| 4,120,452 | 10/1978 | Kimura | 235/487 |

Primary Examiner—Daryl W. Cook
Attorney, Agent, or Firm—William L. Martin, Jr.

[57] ABSTRACT

An owner identification method and article for collecting, identifying, addressing, and mailing lost personal accessories to their proper owner, whereby a coded card carrying on its face only such uncoded alphanumeric information as will facilitate delivery, so that the card and lost item will arrive at a central lost item processing location at which coded information from the card can be converted into the true owner's uncoded mailing label to be applied to the packaging in which the lost item is to be mailed to its rightful owner. The card includes means for attachment to personal accessories and it may be adapted for use with a variety of memory and coding technologies including optical character recognition, magnetics, infra-red (magic middle), embossed character recognition, and semiconductor memory.

13 Claims, 6 Drawing Figures

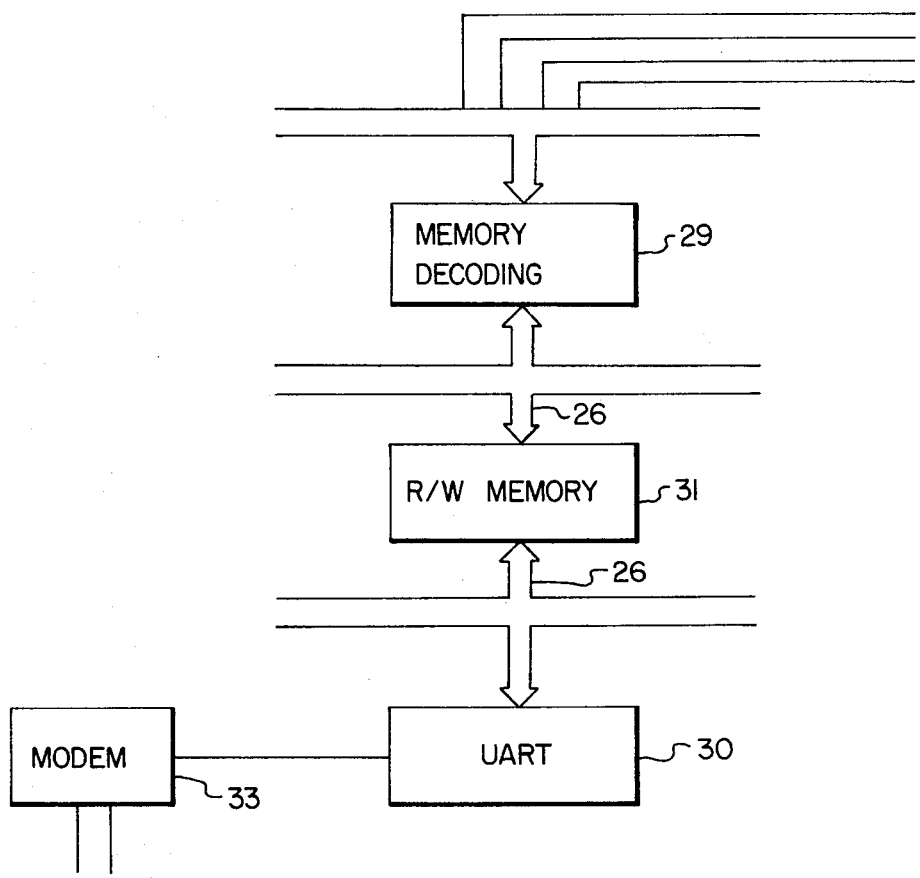
FIG. 4
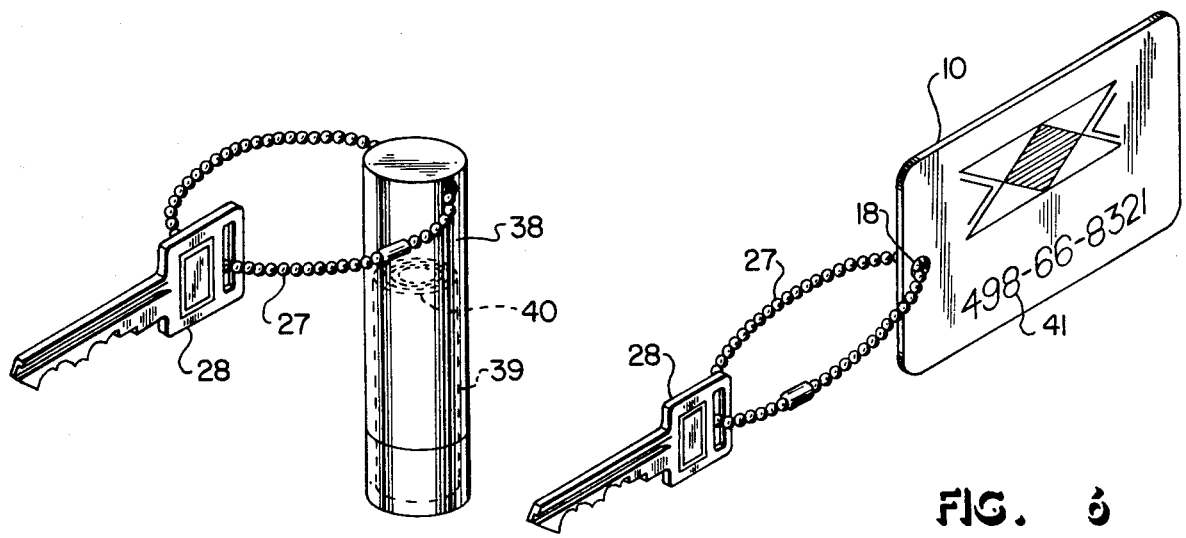
FIG. 5
FIG. 6

LOST PERSONAL ACCESSORY RETURN METHOD AND ARTICLE

FIELD OF THE INVENTION

This present invention relates generally to the processing of lost items, and more particularly to an improved method for the systematic collection of lost items while maintaining secrecy as to the ownership of such items to be accomplished by use of coded information attached to lost items prior to their being lost so that the owner's true identity is not prematurely revealed, the conversion of such coded information into address, labels, and associated paraphernalia for return of the lost item to its rightful owner.

DESCRIPTION OF PRIOR ART

There are certain items which have little intrinsic value and for which no readily identifiable market exists. Yet such items may have considerable value to their rightful owners and may represent a substantial threat to the security and privacy of the rightful owners if such articles should fall into the hands of malicious or dishonest persons. Thus, there exists a need for a system by which the true identity of the rightful owner can be kept secret until such time as the article to be returned has arrived at an authorized central processing location. The authorized central processing location should be the only facility able to decode mailing information pertaining to the rightful owner of the item to be returned. While it may still be possible for unauthorized parties to decode the information such unauthorized decoding would require substantial investment in equipment and training. The acquisition of such equipment and personnel would attract attention and would thus make it easier for law enforcement officials to track down the person or persons who initiated the trespass against the rightful owner's privacy and security. No known prior art method or device achieves such a secure and prompt return of the sorts of articles described above.

A search has been conducted by the applicant prior to the filing of this patent application. Without admitting that the following patents are prior art against this invention and without asserting that these patents are representative of the prior art, the following patents are brought to the attention of the Examiner:

1. Evalt, U.S. Pat. No. 2,357,641;
2. Hines, U.S. Pat. No. 2,865,120;
3. Hines, U.S. Pat. No. 2,812,601.

Evalt discloses the use of identification tags with hotel keys permanently attached by links and chains. The tag may be of any of a number of compositions on which the name and location of hotel, the room number, and other identifying induciae are suitably impressed. The tag may easily be altered to substitute new information thereon.

Hines discloses an identification tag construction which protects mailing information and facilitates the prompt and direct return by mail of keys with a minimum of effort and expense. Hines notes in column 1, lines 26 through 38 of his patents that a solution to the return of the lost keys "involves the distribution by an organization of key tags bearing the organization's address." Hines describes how such tags bear a code number by which the organization may cross reference to an index so that identification of the owner can be made, the keys packaged, and mailed to the owner.

Neither the Hines patent nor any other reference presently known to the applicant discloses a method for return of lost items while maintaining secrecy as to owner's identity. The system described by Hines requires the display of readily discernable numeric or alphabetic information which may easily be converted into prejudicial information by unauthorized parties. In any event the Hines patent discloses a system which is cumbersome, slow, and which has been abandoned by its authors because of its complexity and expense. Thus, the prior art does not disclose a method of facilitating the expedious return of lost items to their proper owner.

It is therefore a primary object of the present invention to provide a means for the profitable return of lost items without compromising the privacy and security of the rightful owner of such items.

SUMMARY OF THE INVENTION

This invention relates to a method and article for the return of lost items to their rightful owners and more particularly to the combination of a portable item with a card particularly adapted for use with automatic sorting machinery of the kind used for encoding and reading data on plastic cards in banking and credit institutions throughout the country.

This invention contemplates that an authorized central processing facility will utilize well known methods of optical character recognition (OCR), magnetics, infrared, (magic middle) and embossed character recognition (ECR) for decoding and charging services to the pre-existing account of the true owner of lost articles. The combination of identification and billing for lost returned services to the pre-existing account by reference to a pre-existing account number will make applicant's system an important profit generation center for banking and credit institutions in the next decade.

As is well known, all banks and credit institutions assign credit identification to customers for use in cash and credit transactions. It is also well known that banks and credit institutions from which checks are drawn have an indentification number and that this identification number is used in clearing house operations and other routine transactions. With the advent of electronic funds transfer, these institutional identification numbers will become even more prevelant. Accordingly, it is common for the coded card issued by these institutions to contain coded characters corresponding both to the institution and to its customer.

Recent technology allows the electronically accessable storage of at least three codes in a character recognition format. When a card having three sets of identifying symbols is presented to any bank or credit institution through remote terminals anywhere in the country, it may be processed electronically.

It is an object of this invention to provide a method by which coded cards and attached personal accessories may be received and processed by a lost accessory return station. The return station assigns a control number to the transaction. Adhesive labels bearing the control number are applied to the personal accessory and to the attached coded card. To coded card is then detached from the personal accessory. The personal accessory is packaged for mailing and placed upon a postage weighing scale. Postage charges and job control number are then entered by key board into a remote terminal. At the same time, the coded card is introduced into electronic character recognition machinery. The recognition machinery will react to the character coding on the card and will actuate various components and peripherials of the computer system to print an address label, billing statement, and reward check voucher. The address label and proper postage are then applied to the packaged personal accessory and mailed with the billing statement to the owner of the account corresponding to the characters recognized by the recognition equipment. The station then pays to the finder of the article the reward provided for in the check voucher.

This system and the supporting apparatus provide many previously unobtainable benefits. The system and its implementing apparatus provide a means for compensating both the finder and the processor of the lost items of personal accessory. At the same time, the owner of the lost personal accessory is protected in at least two ways. First, the owner's identity is not disclosed to the finder of the personal accessory. This first benefit protects the owner in the event that the lost personal accessory is a sensitive item such a set of keys. The second protection afforded the owner relates to loss return transaction safeguards built into the coding of his coded authorization card. For example, the coded card may be used to inform the operator of the return station as to the nature of the item originally attached to the card. This would prevent an unscrupulous person from detaching sensitive items from the card and substituting worthless items prior to claiming the reward.

Another object of this invention is to provide an electronically programmable read only memory (PROM) mounted in a leadless chip carrier per JEDEC standards which in turn is laminated into a slotted card. The E PROM and leadless chip carrier can be accessed by programming and reading equipment by means of elastomeric connector elements inserted into four narrow rectangular slots in one surface of the card and immediately above the contact surfaces of the leadless chip carrier containing the PROM. The elastomeric connector elements have characteristics similar to those described in data sheet CEC-0920, October 1978, published by Tecknit Company of Cranfort, New Jersey. These elastomeric electric connectors are inserted into recesses in the face of the coded card after the card is washed with a suitable cleaning agent such as a circuit board cleaner. Thus, electrical contact is made between the leadless chip carrier containing the E PROM and the connector bearing adapter which may then be inserted into a control unit for programming or reading.

On the face of the card are written instructions informing the finder that he may bring the card with the attached accessory to any return station and there receive a specified reward for his efforts.

Other objects and advantages of the invention will be pointed out specifically or will become apparent from the following description when it is considered in conjunction with the appended claims and the accompanying drawings.

BRIEF DESCRIPTION OF THE DRAWINGS

FIG. 4 is a diagrammatic view showing the manner in which the key holder combination of FIG. 1 is interfaces with various automated machinery.

FIG. 5 is a perspective view of a key holder combination constructed in accordance with another embodiment of the invention.

FIG. 6 is a perspective view showing the key holder combination constructed in accordance with a third embodiment of the invention.

DESCRIPTION OF THE PREFERRED EMBODIMENT

Figure 1:
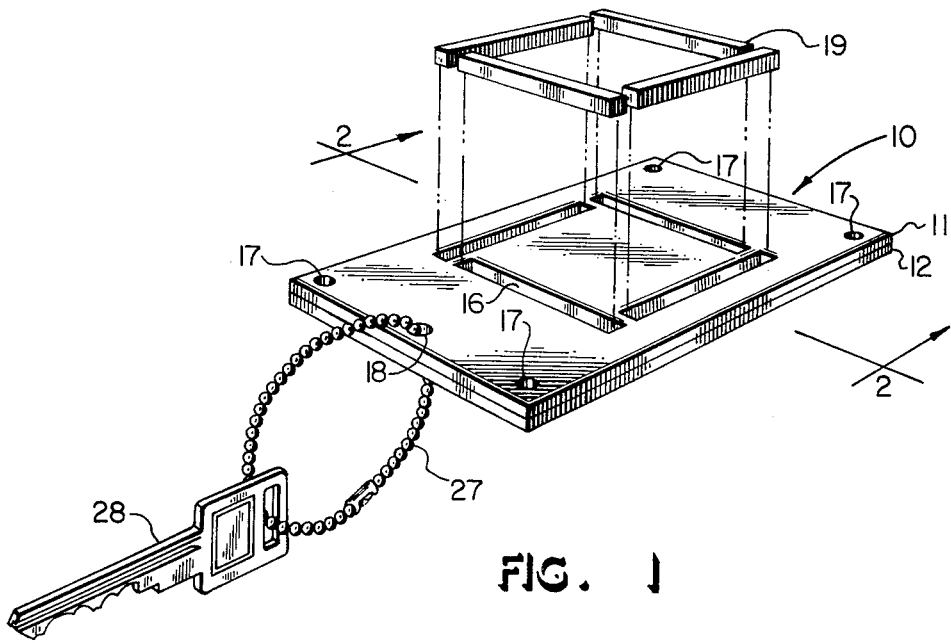
FIG. 1 is an exploded perspective view of a key holder combination constructed in accordance with one embodiment of the invention.
Figure 2:
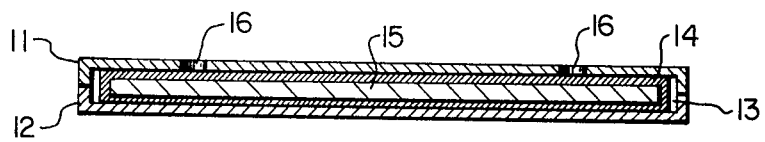
FIG. 2 is a cross-sectional view taken along line 2—2 of FIG. 1.

Referring now to the figures wherein like numerals designate like parts, a preferred embodiment of the present invention will be described in detail. A card 10, or the like of the kind with which the invention is adapted for use is indicated in FIGS. 1 and 2 as comprising first 11 and second 12 layers of laminated card 10 in which are disposed opposite and generally square cavities 13 suitable for receiving a leadless chip carrier 14 within which is contained an electronically programmable read only memory chip (hereinafter referred to as E PROM) 15. First layer 11 is provided with four narrow slots 16 for communication between the underlying leadless chip carrier 14 and external accessing means.

Slots 16 are at least 0.63 plus or minus 0.13 millimeters deep, 0.15 plus or minus 0.08 millimeters wide, and 6.35 plus or minus 0.18 millimeters long. The slots 16 are positioned in counter clock-wise overlapping relationship with each other along the borders of cavity 13 which measures approximately 10.57 millimeters by 10.57 millimeters.

The thickness of first 11 and second 12 layers is 1.93 millimeters except in cavities 13 where the thickness is 9.63 plus or minus 0.13 millimeters.

The leadless chip carrier 14 contains an E PROM 15 which is of the metal oxide semi-conductor variety having the characteristics of part number 2716 manufactured by Mostex Corporation of Dallas, Texas, but adapted to be enclosed in a leadless chip carrier 14 according to the standards of JEDEC. The E PROM is bonded into the cavity of the second layer 12 and the first layer 11 is laminated to the second layer 12 to produce coded card 10. Four alignment holes 17 having a diameter of 1.57 millimeters are then drilled through the card at the four corners of the hidden cavity 13. The alignment holes 17 should be spaced 12.14 millimeters apart and should be located so that the corners of the enclosed cavity 13 are just breached by the alignment hole 17.

The coded card 10 could be of dimensions 54 millimeters by 28.5 millimeters with an attachment hole 18 centered 9.5 millimeters from the end of the coded card. The attachment hole 18 should have a diameter of 6.35 millimeters. FIG. 2 shows by cross section the leadless chip carrier 14 and PROM 15 within the chip carrier 14 all enclosed within the vinyl card stock 10. Slots 16 provide outside communication with the leadless chip carrier 14 as is more fully described in association with FIG. 3.

FIG. 1 also discloses four elastomeric electrical connectors 19 having the characteristics of a 1006 carbon ZEBRA connector manufactured by Tecknit Company of Cranford, New Jersey. Each of the four elastomeric electrical connectors 19 are of a size corresponding to a snug fit within the slot 16.

Figure 3:
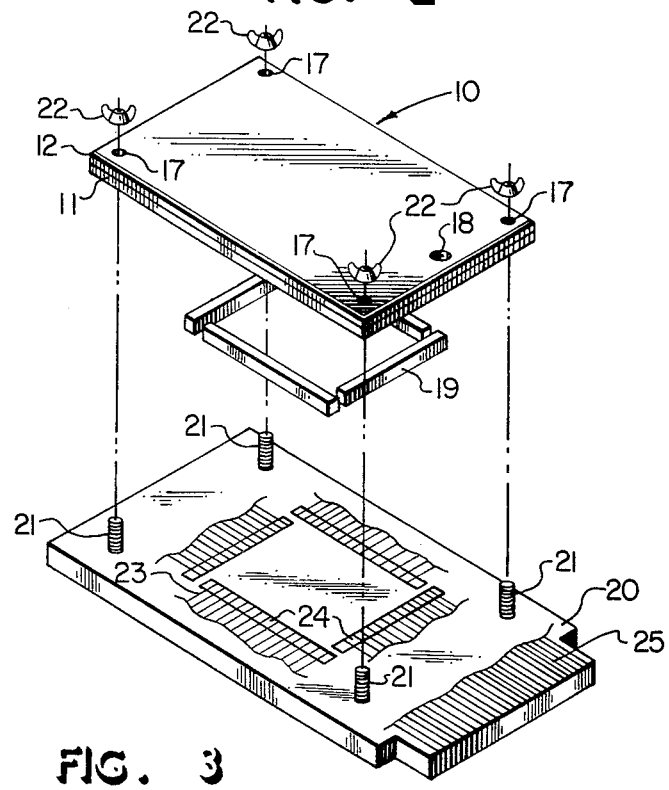
FIG. 3 is an exploded perspective view showing the interrelation of connectors necessary for adaptation of an interiorly disposed leadless chip carrier of the key holder combination to a conventional 24 pin socket.

Adapter 20 of FIG. 3 discloses four threaded alignment posts secured at the vertices of an imaginary square having sides approximately 12.14 millimeters in length. Alignment wing nuts 22 screw onto the alignment posts. Adapter 20 of FIG. 2 further discloses a printed circuit board 23 having at least twenty four exposed contact surfaces 24 corresponding to the twenty four surfaces on leadless chip carrier 14.

In operation, elastomeric connectors 19 in slots 16 are pressed between card 10 and adapter 20 by inserting alignment posts 21 through alignment holes 17 and tightening nuts 22. Thus, electrical contact is made between circuit board 23 and E PROM 15.

Circuit board 23 is provided at its edge with suitable connectors 25 for connection to a bused motherboard or card rack of conventional design. Thus the E PROM can be integrated into a larger data processing system with orderly signal flow between it and peripheral and input/output devices of conventional design as portrayed by FIG. 4.

For use in the return method contemplated by this invention, circuit board connectors 25 are attached to ribbon cable connector 26 which in turn, is plugged into a PROM programmer such as Pro-Log Generic Personality Module for use on the M900 Control Unit as described in the Pro-Log 1978/79 Price List and Short Form Catalog. The E PROM 15 may then be programmed with the identification number of a credit institution, the account number of the individual who is to pay for the return service, and a number describing the classification of goods attached to the card. Card 10 is then removed from adapter 20 and attached by means of chain 27 to the personal accessory to be protected 28. Of course, the PROM 15 could also be programmed to contain detailed health, financial, and biographical history depending on the code size in bits necessary to identify the number of possible messages, using the well known formula $I = \log_2 n$ where I equals code size in bits and n equals the number of possible messages to determine code size.

FIG. 4 shows the PROM 15 connected through its adapter 20 to memory and input/output decoding circuitry 29 of a conventional design. Also shown is the E PROM 15 connected to a universal asynchronous receiver transmitter (UART) 30 for synchronization, formatting, and parallel to serial conversions necessary for communication with teleprinters or other ASCII terminals. An alternative signal route is provided through an intermediate read/write memory 31 to a second UART 32 and modem 33 for access to a distributed data processing network (DDP) 34 including a mainframe central computer such as the IBM 370 Computer 35 and distributed processors using the Hewlett Packard (HP) 3000 Computer 36 multiplexed with the HP 1000 minicomputer 37 or the HP 2026 intelligent terminal 38.

Another embodiment of the present invention shown in FIG. 5 is a small hollow, cylindrical tube 38 suitable for attachment to personal accessories 28 by chain 27 wherein a hollow cylindrical tube 38 suitable for attachment to personal accessories 28 by chain 27 wherein a hollow cylinder 39 within the tube contains a a roll of punched tape 40 coded to include the sorts of information previously discussed, limited only by the length of the punched tape. In this embodiment, the tube would be sealed with uncoded delivery information 41 on the outside of the tube. When brought to a return staton, the tube would be broken open and the tape removed for reading on a standard tape reader. The taper reader could interface with the DDP 34 through operator entry at an HP 2026 intelligent terminal 38 in place of the modem 33 connection previously described.

In another embodiment, the card tag is coded by a magnetic stripe or tape of durable magnetic oxide as used by American Banking Association for use with a suitable reader. The Litton Kimball M&M Magnetic Stripe, (3717 Park Place, Montrose, Calif. 91020) has four Data Tracks: (1) International Air Transportation Association (I.A.T.A.) (2) American Banking Association (A.B.A.) (3) Thrift Industry (4) Docutel. There is space for 98 characters across the standard credit card 3⅜ inches long or 2.54 centimenters long. The Kimball M&M Magnetic Stripe had dimensional flexibility with various thicknesses and density with little distortion.

Other embodiments of the present invention shown in FIG. 6, employ card coding by Optical Character Recognition. (O.C.R-A) Alphanumeric Font, Farrington 7B Font the E13B (MICR) Font; machine or human readable. The American National Standard Institute Inc., 1430 Broadway, New York, N.Y. 10018, sets the description, scope and identification for graphic shapes to be used in the application of OCR-A and OCR-B Fonts. There are three sizes provided-I, III, IV (II is reversed for certain international applications). The Recognition Products Inc., Dallas, Texas 75222,; O.C.R. Wand Reader Class 130 offers a complete optical character recognition system which automatically reads and converts machine printed and human readable source data to keyboard-parallel computer acceptable input codes compatable with the IBM 3270 with hard print copier. It is also used with other keyboard equipped intelligent communications data entry terminals. The Key-to-storage system receives data output from the O.C.R. Wand reader passed over the encoded tag card and treats it as if it had come from keyboard. The computer and printer are activated and the hand copy mailing and billing labels are produced for further processing and mailing.

In another embodiment, the card tag would be coded with a Bar Code Scanning System as used in Universal Products Code System or Identicon Series 600 Light Pen/Fixed Beam System manufactured by Ferranti Identicon, One Kenwood Circle, Franklin, Ma. 02038 in Brochure No. 600578. This bar code system will print and read resolution of bars down to 0.006 inches (0.152 mm). This allows for an extremely wide range of bar code formats to be read with reading accuracy in excess of 99.99%. The pen reader uses long-life LED in the visible or infrared range as its light source. The decoders stand along as sole data processing units in simple application or they can be interfaced with more complex CRT terminals or other OEM equipment or be a complete multiplexing system, handling 16 remote stations with a single decoder interfaced by one serial output line to the main computer.

The PROM embodiment can be totally integrated with Intel Corporation Programmable Keyboard-Display Interface No. I8279 as shown in their Intel Component Data Catalog 1979. The 8279 has programmable keyboard and display I/O interface for microprocessors. The numeric and alphanumeric segment may be used as well as simple indicators. It has a 16×8 display PROM which can be organized into dual 16×4 display. The PROM can be loaded or interrogated by the CPU. Both right entry calculator and left entry typewriter display formats are possible. Both read and write of the display PROM can be done with auto-increment of the display PROM address. The PROM can be read on display viewer or with Intel Model 770 Printer Intellec Series II for hard copy original and up to four copies.

In another embodiment further comprises an encoded Embossed Character Recognition (E.C.R.) font on tag or card. Farrington 7B Selfchek and Farrington 12L Selfchek are popular character fonts. The Data Card Corp., 7625 Parklawn Ave., Minneapolis, Minn. 55435, Series 1500 Printer encoder is best suited to emboss and encode card tags using direct magnetic tape input with peripheral controller and Keyboard for manual input, visual display and automatic print out verifier form. The card tags can be received by the return station and decoded by either standard keyboard input or Recognition Products, Inc., Dallas, Texas 75222, O.C.R. Wand Reader Class 130 that offers wide variety of type faces, hand-printed numerals and ink-jet printed bar codes (mark sense). The TRACE O.C.R. Wand Reader Class 130 can scan read the Embossed code and activate the computer and printer on line with hard copy mailing and billing label for further processing and mailing.

I claim:

1. A method for confidential return of a lost personal accessory item to its owner, comprising the steps of:
   (a) printing generally applicable finder's return instructions on at least one surface of a holder,
   (b) incorporating coded credit, expenditure, authorization, address, and personal accessory item classification information into the holder,
   (c) attaching the holder to a personal accessory item subject to loss,
   (d) accessing the coded information to a distributed data processing system when lost.

2. A method for confidential return of a lost personal accessory item to its owner as defined by claim 1, wherein said step of incorporating said coded information into said card further comprises:
   (e) placing an electrically programmable read-only-memory chip within a leadless chip carrier,
   (f) enclosing the leadless chip carrier within a smooth polyvinyl chloride card stock having dimensions of 54 millimeters by 28.5 millimeters and overall thickness of 3.86 millimeters,
   (g) providing slots in one side of the card stock suitable for inserting elastomeric connectors in electrical contact with one face of said leadless chip carrier,
   (h) drilling alignment holes in the card stock near corners of the leadless chip carrier,
   (i) fashioning an adapter out of circuit board with at least twenty-four exposed electrical pathways suitable for elastomeric connection to the leadless chip carrier,
   (j) forming bus connectors at an edge of the adapter,
   (k) fixing threaded alignment posts to the adapter suitable for inserting into the alignment holes,
   (l) inserting elastomeric connectors into said slots,
   (m) passing the four alignment posts through the alignment holes from the slotted side to the smooth side of the card stock,
   (n) placing nuts on the alignment posts,
   (o) tightening the adapter against the card stock by turning the nuts,
   (p) connecting the electronically programmable read only memory chip through the adapter to a programming device,
   (q) programming the electronically programmable read only memory with the programming device so that codes for credit authorization, expenditure authorization, address and personal accessory item classification information are stored therein.

3. A method for confidential return of a lost personal accessory item to its owner as defined in claim 2, wherein said step of accessing the coded information to a distributed data processing system further comprises:
   (r) inserting elastomeric connectors into said slots,
   (s) passing said alignment posts through said alignment holes from the slotted side to the smooth side of the card stock,
   (t) placing nuts on the alignment posts,
   (u) tightening said adapter against the card stock and elastomeric connectors by turning the nuts,
   (v) connecting the bus connectors of the adapter to data and address buses of a memory interface so that electrical communication is established between the electronically programmable read only memory chip, a universal asynchronous receiver transmitter, and a decoding circuitry,
   (w) connecting the universal asynchronous receiver-transmitter to a modulator-demodulator for virtual telecommunication access to a remote data processing facility.

4. A method for confidential return of a lost personal accessory item to its owner as defined in claim 1, wherein said step of incorporating said coded information into said holder further comprises:
   (e) punching coded information onto punched tape,
   (f) inserting the punched tape into the holder.

5. A method for confidential return of a lost personal accessory item to its owner as defined in claim 4, wherein said step of accessing the coded information to a distributed data processing system further comprises:
   (g) removing the punched tape from the holder,
   (h) reading the punched tape with a punched tape reader.

6. A method for confidential return of a lost personal accessory item to its owner as defined in claim 1, wherein said step of incorporating said coded information into said holder further comprises:
   (e) embossing raised indicia coded account identification numbers onto a surface of the holder.

7. A method for confidential return of a lost personal accessory item to its owner as defined in claim 1, wherein said steps of incorporating said coded information into said holder further comprises:
   (e) encoding optical character recognition indicia onto a surface of the holder.

8. A method for confidential return of a lost personal accessory item to its owner as defined in claim 1, wherein said step of incorporating said coded information into said holder further comprises:
   (e) affixing magnetic tape to the holder.

9. A method for confidential return of a lost accessory item to its owner as defined in claim 1, wherein said step of incorporating said coded information into said holder further comprises:
   (e) putting bar code optical one scanning indicia onto a surface of the holder.

10. A method for confidential return of a lost personal accessory item to its owner as defined in claim 1, wherein said step of incorporating said coded information into said holder further comprises:
    (e) embedding infra-red light sensitive indicia within the holder.

11. A method for confidential return of a lost personal accessory item to its owner, comprising the steps of:

(a) printing generally applicable finder's return instructions on at least one surface of a holder,
(b) creating coded credit, expenditure authorization, address, and personal accessory item classification information,
(c) punching the coded information onto punched tape,
(d) inserting the punched tape into the holder,
(e) attaching the holder to a personal accessory item subject to loss,
(f) removing the punched tape from the holder when lost,
(g) reading the punched tape with a punched tape reader.

12. A method for confidential return of a lost personal accessory item to its owner, comprising the steps of:
(a) printing generally applicable finder's return information on at least one surface of a holder,
(b) embossing raised indicia coded account identification numbers onto a surface of the holder,
(c) attaching the holder to a personal accessory item subject to loss,
(d) accessing the coded information to a distributed data processing system when lost.

13. A method for confidential return of a lost personal accessory item to its owner, comprising the steps of:
(a) printing generally applicable finder's return instructions on at least one surface of a holder,
(b) placing an electrically programmable read only memory chip within a leadless chip carrier,
(c) enclosing the leadless chip carrier within a smooth polyvinyl chloride card stock,
(d) providing slots in one side of the card stock suitable for inserting elastomeric connectors in electrical contact with one face of said leadless chip carrier,
(e) drilling alignment holes in the card stock near corners of the leadless chip carrier,
(f) fashioning an adapter out of circuit board with at least twenty-four exposed electrical pathways suitable for elastomeric connection to the leadless chip carrier,
(g) forming bus connectors at an edge of the adapter,
(h) fixing alignment posts to the adapter suitable for inserting into the alignment holes,
(i) inserting elastomeric connectors into said slots,
(j) passing the four alignment posts through the alignment holes from the slotted side to the smooth side of the card stock,
(k) placing tightening means on the alignment posts,
(l) tightening the adapter against the card stock,
(m) connecting the electronically programmable read only memory chip through the adapter to a programming device,
(n) programming the electronically programmable read only memory with the programming device so that codes for credit authorization, expenditure authorization, address and personal accessory item classification information are stored therein,
(o) attaching the holder to a personal accessory item subject to loss,
(p) losing the holder and the attached personal accessory item,
(q) inserting elastomeric connectors into said slots,
(r) passing said alignment posts through said alignment holes from the slotted side to the smooth side of the card stock,
(s) placing tightening means on the alignment posts,
(t) tightening said adapter against the card stock and elastomeric connectors,
(u) connecting the bus connectors of the adapter to data and address buses of a memory interface so that electrical communication is established between the electronically programmable read only memory chip, a universal asynchronous receiver-transmitter, and a decoding circuitry,
(v) connecting the universal asynchronous receiver-transmitter to a modulator-demodulator for virtual telecommunication access to a remote data processing facility.

* * * * *